(12) United States Patent
Wollenweber

(10) Patent No.: US 8,205,429 B2
(45) Date of Patent: Jun. 26, 2012

(54) METHODS FOR OPERATING GAS TURBINE ENGINES

(75) Inventor: Gary C. Wollenweber, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 915 days.

(21) Appl. No.: 12/257,971

(22) Filed: Oct. 24, 2008

(65) Prior Publication Data
US 2009/0106978 A1   Apr. 30, 2009

Related U.S. Application Data

(62) Division of application No. 11/143,246, filed on Jun. 2, 2005, now Pat. No. 7,464,533.

(51) Int. Cl.
F02C 6/04 (2006.01)

(52) U.S. Cl. ................ 60/204; 60/772; 60/785

(58) Field of Classification Search .......... 60/39.15, 60/39.183, 204, 224, 226.1, 772, 782, 785
See application file for complete search history.

(56) References Cited

U.S. PATENT DOCUMENTS

| | | |
|---|---|---|
| 5,137,230 A | 8/1992 | Coffinberry |
| 5,160,080 A | 11/1992 | Hines et al. |
| 5,414,992 A | 5/1995 | Glickstein |
| 5,452,573 A | 9/1995 | Glickstein et al. |
| 5,511,374 A | 4/1996 | Glickstein et al. |
| 5,899,085 A | 5/1999 | Williams |
| 6,305,156 B1 | 10/2001 | Lui |
| 6,415,597 B1 | 7/2002 | Futamura et al. |
| 6,968,674 B2 | 11/2005 | Wollenweber |
| 7,055,306 B2 | 6/2006 | Jones et al. |
| 7,059,136 B2 * | 6/2006 | Coffinberry ............ 60/785 |
| 7,121,078 B2 | 10/2006 | Turco et al. |
| 8,015,795 B2 * | 9/2011 | Schwarz et al. ......... 60/224 |
| 2004/0144096 A1 | 7/2004 | Wollenweber |
| 2004/0168427 A1 | 9/2004 | Truco et al. |
| 2004/0211166 A1 | 10/2004 | Albero et al. |

(Continued)

FOREIGN PATENT DOCUMENTS
EP   0459816 A1   12/1991
(Continued)

OTHER PUBLICATIONS
Japanese language Office Action for copending Japanese patent application No. 2006-153578.
(Continued)

Primary Examiner — Louis Casaregola
(74) Attorney, Agent, or Firm — David J. Clement, Esq.; Armstrong Teasdale LLP

(57) ABSTRACT

A method facilitates assembling a gas turbine engine assembly. The method comprises providing at least one propelling gas turbine engine that includes a core engine including at least one turbine, coupling an auxiliary engine to the propelling gas turbine engine such that during operation of the propelling gas turbine engine, such that at least a portion of the airflow entering the propelling gas turbine engine is extracted from the propelling gas and channeled to the auxiliary engine for generating power, and coupling a modulating valve in flow communication to the propelling gas turbine engine to control the flow of airflow from the propelling gas turbine engine to the auxiliary engine, wherein the modulating valve is selectively operable to control an extraction point of airflow from the propelling gas turbine engine.

14 Claims, 2 Drawing Sheets

U.S. PATENT DOCUMENTS

2005/0210863 A1     9/2005    Wollenweber et al.
2008/0118371 A1*   5/2008    Vasquez et al. ................ 417/77

FOREIGN PATENT DOCUMENTS

| | | |
|---|---|---|
| EP | 0511935 A1 | 11/1992 |
| EP | 0517459 A1 | 12/1992 |
| EP | 1208295 B1 | 5/2002 |
| EP | 1352161 A2 | 10/2003 |
| EP | 1445449 A2 | 8/2004 |
| EP | 1688603 A2 | 8/2006 |
| GB | 2074654 A | 11/1981 |
| JP | 05163963 | 6/1993 |
| JP | 6096991 B | 11/1994 |
| JP | 2004232636 A | 8/2004 |
| WO | 0123724 A2 | 4/2001 |
| WO | 02052136 A2 | 7/2002 |

OTHER PUBLICATIONS

English language translation of Japanese Office Action for copending Japanese patent application No. 2006-153578.

Japanese Office Action for co-pending JP patent application No. 2006-153578 (4 pages).

European Search Report from the European Patent Office, Munich, Germany, for corresponding application No. 06252823.7-2315 (EP06252823), dated Oct. 13, 2009 (9 pages).

* cited by examiner

METHODS FOR OPERATING GAS TURBINE ENGINES

CROSS REFERENCE TO RELATED APPLICATION

This application is a divisional application of U.S. patent application Ser. No. 11/143,246, filed Jun. 2, 2005 now U.S. Pat. No. 7,464,533, which is hereby incorporated by reference and is assigned to assignee of the present invention.

BACKGROUND OF THE INVENTION

This invention relates generally to the gas turbine engines, and, more particularly, to methods and apparatus for operating gas turbine engines used for aircraft propulsion and auxiliary power.

Gas turbine engines typically include a compressor for compressing air. The compressed air is mixed with a fuel and channeled to a combustor, wherein the fuel/air mixture is ignited within a combustion chamber to generate hot combustion gases. The combustion gasses are channeled to a turbine, which extracts energy from the combustion gases for powering the compressor, as well as producing useful work. The exhaust gases are then discharged through an exhaust nozzle, thus producing a reactive, propelling force.

Modern aircraft have increased hydraulic and electrical loads. An electrical load demanded of gas turbine engines increases as flight computers, communication equipment, navigation equipment, radars, environmental control systems, advanced weapon systems, and defensive systems are coupled to aircraft. A hydraulic load demanded of gas turbine engines increases as flight controls, pumps, actuators, and other accessories are coupled to the aircraft. Within at least some known aircraft, mechanical shaft power is used to power hydraulic pumps, electrical generators and alternators. More specifically, electrical and hydraulic equipment are typically coupled to an accessory gearbox that is driven by a shaft coupled to the turbine. When additional electrical power or hydraulic power is required, additional fuel is added to the combustor until a predefined maximum temperature and/or power operating level is reached.

Because the density of air decreases as the altitude is increased, when the aircraft is operated at higher altitudes, the engine must work harder to produce the same shaft power that the engine is capable of producing at lower altitudes. As a result of the increased work, the turbine may operate with increased operating temperatures, such that the shaft power must be limited or reduced to prevent exceeding the engine predefined operating limits.

Within at least some known gas turbine engines, electrical power and hydraulic power is also generated by an auxiliary power unit (APU). An APU is a small turbo-shaft engine that is operated independently from the gas turbine engines that supply thrust for the aircraft. More specifically, because APU operation is also impacted by the air density and is also operationally limited by predefined temperature and performance limits, APUs are typically only operated when the aircraft is on the ground, or in emergency situations while the aircraft is in flight.

BRIEF DESCRIPTION OF THE INVENTION

In one aspect, a method for assembling a gas turbine engine assembly is provided. The method comprises providing at least one propelling gas turbine engine that includes a core engine including at least one turbine, coupling an auxiliary engine to the propelling gas turbine engine such that during operation of the propelling gas turbine engine, such that at least a portion of the airflow entering the propelling gas turbine engine is extracted from the propelling gas and channeled to the auxiliary engine for generating power, and coupling a modulating valve in flow communication to the propelling gas turbine engine to control the flow of airflow from the propelling gas turbine engine to the auxiliary engine, wherein the modulating valve is selectively operable to control an extraction point of airflow from the propelling gas turbine engine.

In another aspect, a gas turbine engine assembly is provided. The gas turbine engine assembly includes at least one propelling gas turbine engine, a modulating valve, and an auxiliary engine used for generating power. The propelling gas turbine engine includes a fan, a core engine downstream from the fan, and a plurality of extraction points. The modulating valve is coupled in flow communication to each propelling gas turbine engine. The auxiliary engine includes at least one turbine and an inlet. The inlet is coupled in flow communication with the modulating valve, such that a portion of airflow entering the propelling engine is extracted for use by the auxiliary engine and such that the modulating valve controls the flow of airflow from the propelling engine to the auxiliary engine. The modulating valve is selectively operable to extract airflow from at least two of the plurality of extraction points.

In a further aspect, an aircraft gas turbine engine assembly including a propelling gas turbine engine, a modulating valve, and at least one auxiliary engine is provided. The propelling gas turbine engine includes a core engine and an exhaust. The core engine includes at least one turbine, and the propelling gas turbine engine is used for generating thrust for the aircraft. The modulating valve is coupled in flow communication with at least one of a plurality of airflow extraction sources defined within the propelling gas turbine engine. The auxiliary engine includes an inlet, at least one turbine, and an exhaust. The inlet is coupled in flow communication with the modulating valve such that a portion of airflow flowing through the propelling engine is selectively extractable from the at least one propelling engine and is channeled to the auxiliary engine for generating power.

DETAILED DESCRIPTION OF THE INVENTION

Figure 1:
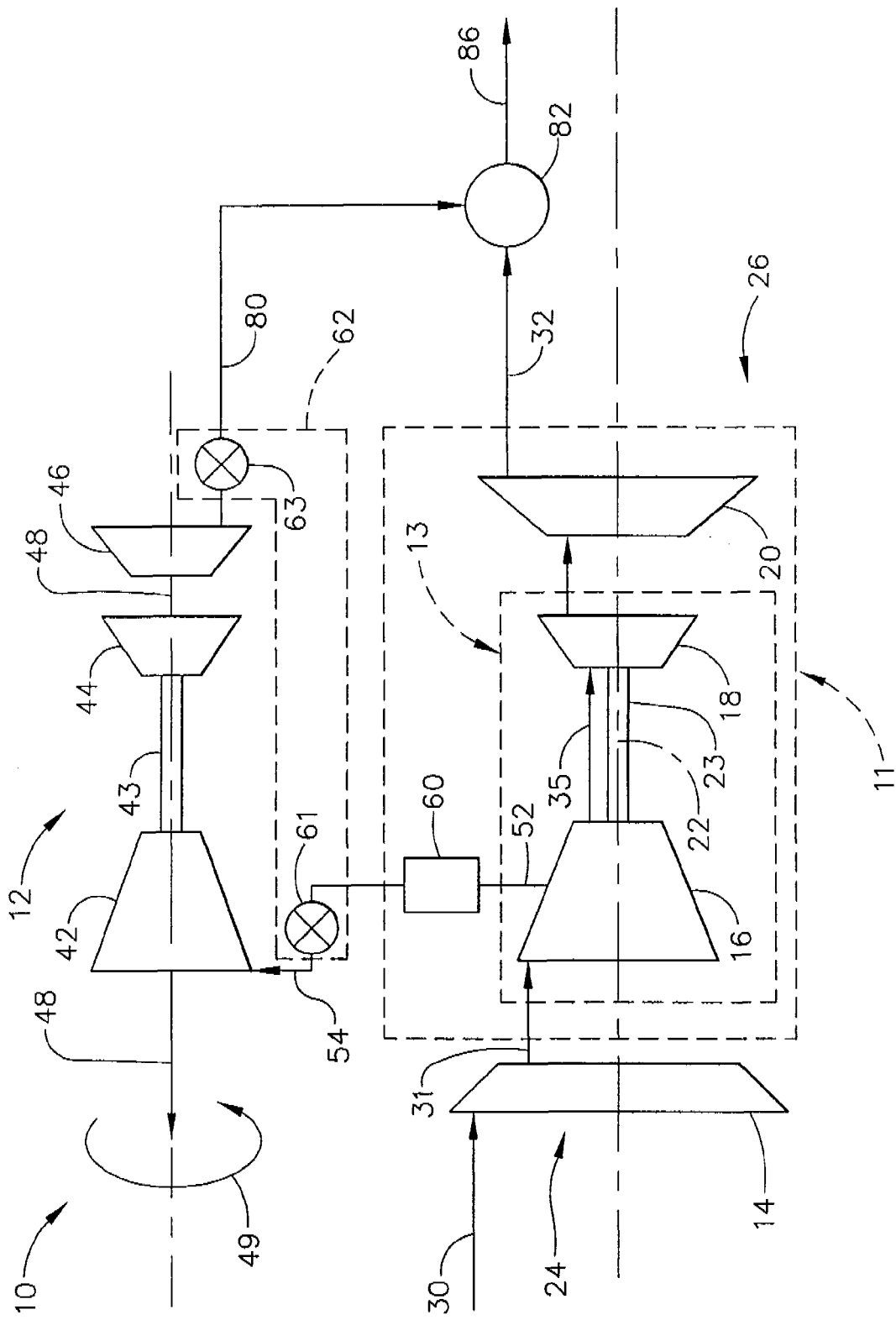
FIG. 1 is an exemplary schematic view of a gas turbine engine assembly.

FIG. 1 is an exemplary schematic view of a gas turbine engine assembly 10 including a propelling gas turbine engine 11 and an auxiliary power unit or auxiliary power engine 12 that are coupled together, as described in more detail below, in a combined cycle. More specifically, gas turbine engine assembly 10, as described in more detail below, facilitates producing shaft power and propelling force for an aircraft (not shown).

Gas turbine engine 11 includes a core engine 13 and a fan assembly 14 and a low pressure turbine assembly 20. Core engine 13 includes a high-pressure compressor 16, a combustor (not shown), and a high-pressure turbine 18. Fan assembly 14 and turbine 20 are coupled by a first shaft 22, and compressor 16 and turbine 18 are coupled by a second shaft 23. Gas turbine engine 11 also includes an inlet side 24 and an exhaust side 26. In one embodiment, engine 11 is a F118-GE-100 turbofan engine commercially available from General Electric Aircraft Engines, Cincinnati, Ohio.

In operation, inlet air, represented by arrow 30, enters fan assembly 14, wherein the air is compressed and is discharged downstream, represented by arrow 31, at an increased pressure and temperature towards core engine 13 and more specifically, towards high-pressure compressor 16. In one embodiment, engine 11 includes a bypass duct (not shown) such that a portion of air 31 discharged from fan assembly 14 is also channeled into the bypass duct rather than entering core engine 13.

Highly compressed air 35 is delivered to a combustor (not shown) wherein it is mixed with fuel and ignited. Combustion gases propel turbines 18 and 20, which drive compressor 16 and fan assembly 14, respectively. In the exemplary embodiment, core engine exhaust 32 is discharged from engine to generate a propelling force from gas turbine engine assembly 10. In the exemplary embodiment, core engine exhaust 32 is channeled to a variable area bypass injector 82 that is coupled in flow communication with core engine exhaust 32 and auxiliary engine exhaust 80. In an alternative embodiment, core engine exhaust 32 is channeled to a mixing damper (not shown) that is coupled in flow communication with core engine exhaust 32. In another alternative embodiment, core engine exhaust flow and fan air are discharged separately from auxiliary engine exhaust 80 to produce thrust.

Auxiliary power engine 12 is coupled in flow communication to engine 11, as described in more detail below, and includes a compressor 42, a high-pressure turbine 44, and a low-pressure turbine 46. Compressor 42 and high-pressure turbine 44 are connected by a first shaft 43 such that as combustion gases propel turbine 44, turbine 44 drives compressor 42. Auxiliary engine 12 also includes a second shaft 48 coupled to low-pressure turbine 46 which provides shaft power output, represented by arrow 49, for use in the aircraft. Power output 49 may be used to drive equipment, such as, but not limited to alternators, generators, and/or hydraulic pumps. In one embodiment, auxiliary power engine 12 is a turbo-shaft engine, such as a T700-GE-701 engine that is commercially available from General Electric Company, Cincinnati, Ohio, and that has been modified in accordance with the present invention.

Auxiliary ducting (not shown) couples auxiliary power engine 12 to engine 11 to enable a portion of air 31 channeled towards core engine 13 to be directed to auxiliary power engine 12. More specifically, auxiliary airflow, represented by arrow 52 is extracted from core engine 13 at a location upstream from core engine turbine 18. In the exemplary embodiment, airflow 52 is bled from high-pressure compressor 16 and is routed towards auxiliary engine compressor 42. In an alternative embodiment, auxiliary power engine 12 is coupled in flow communication to a pair of engines 11 and receives high pressure airflow 54 from each engine 11. In another alternative embodiment, a pair of auxiliary power engines 12 are coupled in flow communication to a single engine 11 and both receive high pressure airflow 54 from engine 11. More specifically, in the exemplary embodiment, compressor 16 is a multi-staged compressor and air 52 may be extracted at any compressor stage based on pressure, temperature, and flow requirements of auxiliary engine 12. In another embodiment, air 52 is extracted downstream from compressor 16. In a further alternative embodiment, air 52 is extracted upstream from compressor 16. In one embodiment, approximately up to 10%, or more, of air flowing into compressor 16 is extracted for use by auxiliary engine 12. In a further embodiment, air 52 is extracted from any of, but is not limited to being extracted from, a booster interstage, a booster discharge, a fan interstage, a fan discharge, a compressor inlet, a compressor interstage, or a compressor discharge bleed port. In another embodiment, approximately up to 10% or more, of air flowing into fan 14 is extracted for used by auxiliary engine 12.

In an alternative embodiment, engine 11 supplies pressurized or compressed air to auxiliary power engine 12. For example, in one embodiment, compressed air supplied to an aircraft cabin is routed to auxiliary power engine 12 after being used within the aircraft environmental control system. In a further embodiment, auxiliary power engine 12 receives a mixture of airflow from engine 11 and ambient airflow.

Auxiliary airflow 54 directed towards auxiliary engine 12 is at a higher pressure and temperature than airflow 30 entering gas turbine engine assembly 10. Moreover, because the auxiliary airflow 30 is at an increased pressure and temperature than that entering gas turbine engine assembly 10, a density of airflow 54 is substantially similar to the density of airflow that enters auxiliary engine 12 at lower altitudes. Accordingly, because the power output of auxiliary engine 12 is proportional to the density of the inlet air, during operation of core engine 13, auxiliary engine 12 is operable at higher altitudes with substantially the same operating and performance characteristics that are available at lower altitudes by auxiliary engine 12. For example, when used with the F110/F118 family of engines, auxiliary engine 12 produces approximately the same horsepower and operating characteristics at an altitude of 30-40,000 feet, as would be obtainable if auxiliary engine 12 was operating at sea level independently. Accordingly, at mission altitude, a relatively small amount of high-pressure air taken from core engine 13 will enable auxiliary power engine 12 to output power levels similar to those similar from auxiliary power engine 12 at sea level operation.

In the exemplary embodiment, auxiliary airflow 52 is channeled through an intercooler 60 prior to being supplied to auxiliary engine compressor 42. Intercooler 60 has two airflows (not shown) in thermal communication with each other and is designed to exchange a substantial amount of energy as heat, with minimum pressure losses. In the exemplary embodiment, auxiliary airflow 52 is the heat source and a second airflow is used as a heat sink. In one embodiment, the second airflow is fan discharge airflow. In another embodiment, the second airflow is ambient airflow routed through an engine nacelle and passing through intercooler 60 prior to being discharged overboard. More specifically, the operating temperature of auxiliary airflow 54 is facilitated to be reduced within intercooler 60 as the transfer of heat increases the temperature of the other airflow channeled through intercooler 60. In an alternative embodiment, turbine engine assembly 10 does not include intercooler 60.

Intercooler 60 facilitates increasing an amount of power per pound of bleed air 54 supplied to auxiliary power engine 12 without increasing flow rates or changing existing turbine hardware. A control system 62 is coupled to a generator control system (not shown) and facilitates regulating the operating speed of auxiliary power engine 12. In one embodiment, control system 62 throttles inlet air 52 supplied to engine 12 by control of a variable flow area throttle valve 61 and/or controls engine backpressure by control of a variable flow area exit nozzle 63 or a variable area bypass injector 82 to facilitate controlling the operation of auxiliary power engine 12.

Exhaust airflow 80 from auxiliary power engine 12 is channeled towards core engine exhaust 32 at a discharge pressure that is substantially the same as a discharge pressure of exhaust flow 32 discharged from core engine 13. Specifically, in the exemplary embodiment, auxiliary engine exhaust airflow 80 is routed through a variable area bypass injector 82 which facilitates mixing exhaust flow 32 exiting core engine 13 with auxiliary engine exhaust airflow 80. More specifically, in the exemplary embodiment, exhaust airflow 80 is reintroduced to core engine exhaust flow 32 upstream from a propelling core engine nozzle (not shown). The mixed exhaust flow 86 is then discharged through an engine nozzle (not shown). In an alternative embodiment, exhaust airflow 80 is not mixed with core engine exhaust flow 32, but rather is discharged independently from exhaust flow 32.

Accordingly, when operated, auxiliary power engine 12 facilitates providing increased shaft power production for use within the aircraft. More specifically, because auxiliary power engine 12 is selectively operable for shaft power production, auxiliary power engine 12 may be used only when needed, thus facilitating fuel conservation for the aircraft. In addition, the design of gas turbine assembly 10 enables auxiliary power engine 12 to be operated independently of propelling engine 11, such that an operating speed auxiliary power engine 12 is independent of an operating speed of core engine 13. As such, auxiliary power engine 12 may operated during non-operational periods of core engine 13, and moreover, may be used to provide power necessary to start operation of engine 11.

Operation of auxiliary power engine 12 facilitates improving surge margin of engine 11 by bleeding airflow 52 as needed, such that altitude, installation, or distortion effects may be overcome. Moreover, by removing high pressure extraction, auxiliary power engine 12 also facilitates improving an operating performance of core engine 13 while generating significant power. Additionally the hydro mechanical or digital controls of propelling engine 11 and auxiliary power engine 12 are arranged to mutually exchange operational status and performance parameter values (pressure, temperature, RPM, etc) from one to the other.

Figure 2:
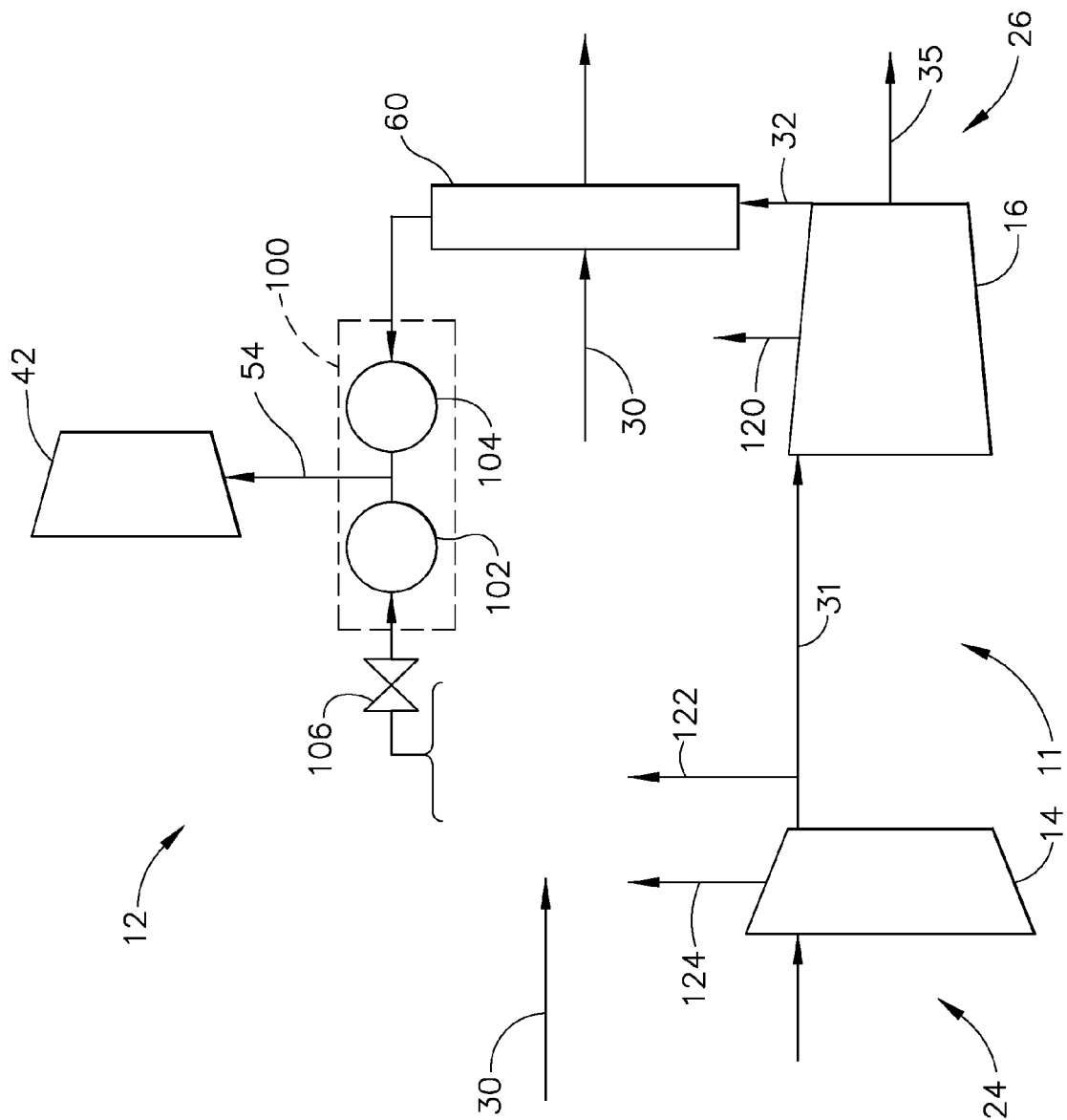
FIG. 2 is a partial schematic view of an alternative embodiment of the gas turbine engine assembly shown in FIG. 1.

FIG. 2 is a partial schematic view of an alternative embodiment of gas turbine engine assembly 10. Specifically, the engine assembly shown in FIG. 2 is the same engine assembly shown in FIG. 1, with the exception of a few component changes, described in more detail below. As such, components shown in FIG. 2 that are identical to components illustrated in FIG. 1 are identified in FIG. 4 using the same reference numerals used in FIG. 1. More specifically, in the embodiment illustrated in FIG. 2, engine assembly 10 includes a control valve assembly 100 that facilitates controlling airflow 54 channeled towards auxiliary power engine 12.

In the exemplary embodiment, control valve assembly 100 includes a pair of modulating or control valves 102 and 104 that are operatively coupled to control system 62. Specifically, in the exemplary embodiment, control valve 102 is known as a low pressure source control valve, and control valve 104 is known as a high pressure source control valve. Valves 102 and 104 work in cooperation, as described in more detail below, to facilitate controlling a temperature, density, and/or pressure of auxiliary airflow 54 channeled to auxiliary power engine 12.

Control valve assembly 100 is coupled in flow communication between propelling engine 11 and auxiliary power engine 12 such that airflow 54 channeled to power engine 12 is routed through valve assembly 100. In the exemplary embodiment, a back-flow control device 106 is coupled between propelling engine 11 and low pressure source control valve 102 to facilitate preventing back flow from control valve assembly 100 towards propelling engine 11. In the exemplary embodiment, control device 106 is, but not limited to being, a check valve assembly. Moreover, in the exemplary embodiment, control valve assembly 100 is coupled in flow communication with propelling engine 11 such that intercooler 60 is coupled in flow communication between propelling engine 11 and control valve 104.

As described above, control valve assembly 100 is operatively coupled to control system 62 such that valve assembly 100, and more specifically, valves 102 and/or 104, are selectively operable to control airflow 54 channeled to auxiliary power engine 12. Moreover, as described in more detail below, during engine operation control system 62 facilitates controlling the extraction location of airflow 54, and thus facilitates controlling the pressure, density, and airflow 54 channeled to auxiliary power engine 12. As such, control valve assembly 100 can be selectively adjusted to facilitate optimizing supply pressure, temperature, and density of airflow 54, thus facilitating minimizing performance penalties associated with engine 12 and maximizing power output 49.

For example, during operation at low altitudes, control system 62 is operable to ensure that auxiliary power engine 12 receives airflow 54 from a low-pressure extraction source, such as, but not limited to fan discharge 31, such that airflow 54 flows through check valve 106 and low pressure control valve 102 prior to being introduced to engine 12. During operation at high altitudes, control valve assembly 100 is adjusted to ensure that auxiliary power engine 12 receives airflow 54 from a high-pressure extraction source, such as, but not limited to compressor discharge 35, such that airflow 54 flows through intercooler 60 and high pressure control valve 104 prior to being introduced to engine 12. During operation at intermediate altitudes, auxiliary power engine 12 receives airflow 54 at an intermediate pressure such that airflow is blended from high- and low-pressure extraction sources through valves 102 and 104.

Control system 62 facilitates controlling control valve assembly 100 to enable auxiliary power engine 12 to receive a low pressure/low temperature/low density airflow, a high pressure/high temperature/high density airflow, or an intermediate pressure/intermediate temperature/intermediate density airflow, based on several factors and/or engine operating characteristics. In one embodiment, such factors may include, but are not limited to including, auxiliary engine operability, demand for auxiliary engine power, propelling engine operability, and/or propelling engine efficiency.

When it is desired to operate auxiliary power engine 12 with a source of low pressure/low temperature/low density airflow, such airflow 122 may be extracted from a plurality of different extraction points within propelling engine 11. For example, fan 14 is a multi-staged compressor and fan interstage bleed air 124 may be extracted from any fan stage based on pressure, temperature, and flow requirements of auxiliary engine 12. Moreover, such airflow may be extracted from any location downstream from fan 14 as booster discharge air, booster inter-stage bleed air, or core drive fan discharge air. Other alternative extraction sources for such airflow may include, but are not limited to including, fan discharge air 31 or fan inter-stage bleed air 124. Furthermore, in another alternative embodiment, ambient air 30 may be used as a source of low pressure/low temperature/low density airflow.

When it is desired to operate auxiliary power engine 12 with a source of high pressure/high temperature/high density airflow, such airflow 52 may be extracted from a plurality of different extraction points within propelling engine 11. For example, as previously described, compressor interstage bleed air 120 may be extracted from any compressor stage based on pressure, temperature, and flow requirements of auxiliary engine 12. Moreover, such airflow may be extracted at any location upstream from compressor 16 as booster discharge air, booster inter-stage bleed air, or core drive fan discharge air.

Control valve assembly 100 increases an operating flexibility of auxiliary power engine 12 and an overall efficiency of gas turbine engine assembly 11. Specifically, control valve assembly 100 enables auxiliary power engine 12 to be operated independently of propelling engine 11. Moreover, because valves 102 and 104 are selectively operable, airflow to auxiliary power engine 12 may be adjusted to facilitate optimizing supply pressure, temperature, and density, thus minimizing performance penalties and maximizing power output 49. In addition, the selective operation of control valve assembly 100 enables low pressure air, at a lower performance penalty, to be used at low altitudes or when a reduced amount of auxiliary power output 49 is required, and enables high pressure air to be used at higher altitudes or when increased power output 49 is demanded. Furthermore, auxiliary engine air supply can also be selectively adjusted in cooperation with propelling engine inlet guide vanes, variable geometry, and a variable bypass injector 82, to facilitate increasing stall margin, improving operability, and to facilitate reducing performance penalties and fuel burns.

The above-described modulating control valve assembly is cost-effective and facilitates increases shaft power production and turbine engine operating efficiency. The control valve assembly is coupled in flow communication between the propelling engine and the auxiliary engine to facilitate enhanced operation and control of airflow channeled to the auxiliary power engine. As such, the control valve assembly may be selectively adjusted to facilitate a small amount of high-pressure air taken from the main engine to enable a smaller engine to output power levels similar to those of sea level operation. As a result, the increased control of airflow directed to the auxiliary engine facilitates increased turbine power production from the auxiliary engine in a cost-effective and reliable manner Exemplary embodiments of gas turbine assemblies are described above in detail. The assemblies are not limited to the specific embodiments described herein, but rather, components of each assembly may be utilized independently and separately from other components described herein. For example, each turbine component and/or auxiliary turbine engine component can also be used in combination with other core engine and auxiliary turbine engine components.

While the invention has been described in terms of various specific embodiments, those skilled in the art will recognize that the invention can be practiced with modification within the spirit and scope of the claims.

What is claimed is:

1. A method for assembling a gas turbine engine assembly, said method comprising:
    providing at least one propelling gas turbine engine that includes a core engine including at least one turbine;
    coupling an auxiliary engine to the propelling gas turbine engine such that during operation of the propelling gas turbine engine, at least a portion of the airflow entering the propelling gas turbine engine is extracted from the propelling gas and channeled to the auxiliary engine for generating electrical power; and
    coupling a modulating valve in flow communication to the propelling gas turbine engine to control the flow of airflow from the propelling gas turbine engine to the auxiliary engine, wherein the modulating valve is selectively operable to control extraction and mixing of airflow from the propelling gas turbine engine from at least two of a plurality of extractions points.

2. A method in accordance with claim 1 wherein coupling a modulating valve in flow communication to the propelling gas turbine engine further comprises coupling the modulating valve to a first extraction point for controlling a flow of high-pressure airflow to the auxiliary engine and to a second extraction point for controlling a flow of low-pressure airflow to the auxiliary engine.

3. A method in accordance with claim 1 wherein coupling a modulating valve in flow communication to the propelling gas turbine engine further comprises coupling the modulating valve to at least a first extraction point to facilitate controlling at least one of a pressure, a temperature, and a density of airflow channeled to the auxiliary engine.

4. A method in accordance with claim 1 wherein coupling a modulating valve in flow communication to the propelling gas turbine engine further comprises coupling the modulating valve to the propelling gas turbine to facilitate increasing a stall margin of the propelling gas turbine engine.

5. A method in accordance with claim 1 wherein coupling a modulating valve in flow communication to the propelling gas turbine engine further comprises coupling the modulating valve to the propelling gas turbine to facilitate increasing an operating efficiency of the propelling gas turbine engine.

6. A method in accordance with claim 1 wherein coupling an auxiliary engine to the propelling gas turbine engine further comprises coupling the auxiliary engine to the propelling gas turbine engine such that during operation the auxiliary engine receives airflow from at least one of an extrication point coupled in flow communication with a high-pressure source of air and an extrication point coupled in flow communication with a low-pressure source of air.

7. A method in accordance with claim 1 wherein coupling a modulating valve in flow communication to the propelling gas turbine engine further comprises coupling the modulating valve to the propelling gas turbine to facilitate the auxiliary engine generating increased shaft horsepower during operation of the gas turbine engine assembly.

8. A method for assembling an aircraft gas turbine engine assembly, said assembly comprising:
    providing at least one propelling gas turbine engine including a core engine and an exhaust, wherein the core engine includes at least one turbine, and wherein the at least one propelling gas turbine engine is for generating thrust for the aircraft;
    coupling an auxiliary engine including an inlet, at least one turbine, and an exhaust to the at least one propelling engine such that a portion of airflow flowing through the at least one propelling engine is selectively extractable from the at least one propelling engine for use in the auxiliary engine for generating electrical power; and
    coupling a modulating valve in flow communication with at least one of a plurality of airflow extraction points defined within the at least one propelling gas turbine engine, wherein the modulating valve is selectively operable to extract and mix airflow from at least two of the plurality of airflow extraction points.

9. A method in accordance with claim 8 wherein coupling a modulating valve in flow communication further comprises orienting the modulating valve to be selectively operable to facilitate controlling at least one of a pressure, a temperature, and a density of airflow extracted from the at least one propelling engine to the at least one auxiliary engine.

10. A method in accordance with claim 8 wherein coupling an auxiliary engine further comprises coupling the at least one auxiliary engine to the at least one propelling engine such that the auxiliary engine is operable independently of at least one propelling gas turbine engine.

11. A method in accordance with claim 8 wherein coupling a modulating valve in flow communication further comprises orienting the modulating valve to facilitate generating increased shaft horsepower during operation of the gas turbine engine assembly.

12. A method in accordance with claim 8 wherein coupling a modulating valve in flow communication further comprises orienting the modulating valve such that operation of the modulating valve facilitates enhancing at least one of a stall margin and the operability of the at least one propelling engine.

13. A method in accordance with claim 8 wherein coupling a modulating valve in flow communication further comprises orienting the modulating valve such that operation of the modulating valve facilitates improving operating performance of the at least one propelling engine.

14. A method in accordance with claim 8 wherein coupling a modulating valve in flow communication further comprises coupling the modulating valve to the at least one propelling engine such that the auxiliary engine receives airflow from at least one extrication point coupled in flow communication with a high-pressure source of air and from at least one extrication point coupled in flow communication with a low-pressure source of air.

* * * * *